US006595451B1

(12) United States Patent
Kang et al.

(10) Patent No.: US 6,595,451 B1
(45) Date of Patent: Jul. 22, 2003

(54) TAPE LOCKING DEVICE FOR TAPE MEASURE

(75) Inventors: Dong-Hun Kang, Pusan (KR); Young J. Choi, Oakland, NJ (US)

(73) Assignee: Komelon Corporation, Pusan (KR)

( * ) Notice: Subject to any disclaimer, the term of this patent is extended or adjusted under 35 U.S.C. 154(b) by 0 days.

(21) Appl. No.: 10/059,536

(22) Filed: Jan. 29, 2002

(51) Int. Cl.$^7$ .................. B65H 75/48; B65H 75/30; G01B 3/10
(52) U.S. Cl. ................ 242/381.2; 242/381.3; 33/767
(58) Field of Search ............ 242/381.2, 381.3; 33/767

(56) References Cited

U.S. PATENT DOCUMENTS

| | | | | |
|---|---|---|---|---|
| 3,812,588 A | * | 5/1974 | Bennett | 33/767 |
| 3,942,738 A | * | 3/1976 | Rutty | 242/381.3 |
| 4,434,952 A | | 3/1984 | Czerwinski et al. | |
| 4,722,495 A | * | 2/1988 | Meredith | 242/381.2 |
| 4,903,912 A | * | 2/1990 | Coughlin | 242/381.2 |
| 6,053,447 A | * | 4/2000 | Omri | 242/381.2 |

* cited by examiner

Primary Examiner—John M Jillions
(74) Attorney, Agent, or Firm—Michael Best & Friedrich LLC

(57) ABSTRACT

Disclosed herein is a tape locking device for tape measures. The tape locking device comprises a locking lever hinged to an upper portion of the wall of the housing in such a way to be rotated frontward and rearward around a hinged joint, and provided with a connecting piece downwardly extending from the locking lever. A cylinder is connected at its first end to a hole formed at the lower portion of the connecting piece, with a coil spring fitted over the cylinder. A wedge-shaped stopper is connected to the second end of the cylinder, and having a desired frictional force. This stopper is elastically biased by the coil spring to be wedged in the gap between the outer circumferential surface of a wound part of the tape around the bobbin and a linear part of the tape led to the slot when releasing the locking lever after drawing a desired length of tape from the slot, so the drawn tape is automatically locked by frictional contact between the stopper surface and the drawn tape surface.

3 Claims, 5 Drawing Sheets

TAPE LOCKING DEVICE FOR TAPE MEASURE

BACKGROUND OF THE INVENTION

1. Field of the Invention

The present invention relates generally to a tape locking device for tape measures, for locking the tape after unwinding the tape from a bobbin by a desired length, and more particularly, to a tape locking device for tape measures, which includes a stopper connected to the lower portion of a locking lever and provided with a coil spring fitted over the stopper and elastically biased by the coil spring to be wedged in the gap between the part of the tape unwound from a bobbin set in a housing and the part of the tape wound around the bobbin, thus automatically locking the drawn tape after drawing a desired length of the tape, in addition to smoothly retracting the tape into the housing.

2. Description of the Prior Art

Generally, a tape measure has a housing, a coiled tape connected at its first end to a spring, and wound around a bobbin set in the housing. A tab is attached to the second end of the tape, and positioned outside a slot formed on the lower end of a wall of the housing. The tab is designed to draw the tape from the housing when pulling the tab. On the other hand, the tape is retracted into the housing by an elastic restoring force of the spring when releasing the tab.

Some tape measures with a locking device have been proposed. This locking device prevents the tape from being undesirably retracted into the housing by the elastic restoring force of the spring, even when a pulling force is removed from the tab after drawing out the tape from the housing.

FIG. 1 is a perspective view showing a conventional tape measure provided with a locking device, and FIG. 2 is a sectional view of the conventional tape measure. As shown in the drawings, the conventional tape measure has a housing 1, a coiled tape 2, and a tab 4. In general, the housing 1 has a U size to be held in a single hand. The coiled tape 2 is connected, at its first end, to a spring (not shown) and wound around a bobbin 3 set in the housing 1. The tab 4 is attached to the second end of the tape 2 for allowing a user to grasp the tape 2 when drawing out the tape from the housing 1 for measuring the length of a desired object. This tab 4 is positioned outside a slot 5 formed on the lower end of a wall of the housing 1.

The tab 4 is downwardly bent to be perpendicular to the bottom of the housing 1, thus preventing the end of the tape 2 attached to the tab 4 from entering the housing 1 through the slot 5 by the restoring force of the spring. In addition, such a bent structure allows the tab 4 to serve as a fixing hook and a contact surface with respect to an end of a measured object.

A locking lever 6 is mounted to the upper portion of the wall where the slot 5 is formed, and locks the drawn tape 2 after drawing out a desired length of tape from the housing 1, while overcoming the spring force of the spring which is applied to the tape 2 to retract the tape 2 into the housing 1.

The locking lever 6 is provided on its back surface with a compression piece 7 which moves up and down along the locking lever 6. The locking operation of the locking lever 6 is as follows. When the locking lever 6 is moved downwardly, the end of the compression piece 7 compresses the portion of the tape 2 led to the slot 5 and locks the tape 2 against its retraction by the restoring force of the spring.

On the other hand, when it is required to retract the locked tape 3 into the housing 1 through the slot 5, the locking lever 6 is moved upwardly so that the compression piece 7 is separated from the locked portion of the tape 2. Then, the drawn tape 2 is retracted into the housing 1 to be rewound around the bobbin 3.

However, such a conventional tape measure has a problem that it is inconvenient to use, since a user must move the locking lever 6 downwards to lock the tape with the drawn tape being grasped, when it is required to lock the drawn tape 2 after drawing a desired length of the tape from the housing 1 by pulling the tab 4 attached to the end of the tape 2. In addition, the conventional tape measure has another problem that the tape may be damaged or scratched, since an excessively strong compressive force is applied to the tape 2 so as to overcome the elastic restoring force of the tape 2.

The conventional tape measure has still another problem that, when the locking lever 6 is restored to its original position so as to retract the drawn tape into the housing, the tape is wound around the bobbin at an excessively high speed by the elasticity of the spring connected to the tape, thus causing a user to be sometimes injured.

SUMMARY OF THE INVENTION

Accordingly, the present invention has been made keeping in mind the above problems occurring in the prior art, and an object of the present invention is to provide a tape locking device for tape measures, which has a locking lever rotatably hinged to the upper portion of the wall of a housing, and a cylinder connected, at its first end, to the lower portion of the locking lever, and connected, at its second end, to a stopper, provided with a coil spring fitted over the cylinder, whereby the stopper is elastically biased by the coil spring to be wedged in the gap between a wound part of the tape around the bobbin and a linear part of the tape led to the slot when releasing the locking lever after drawing a desired length of tape from the slot, thus automatically locking the drawn tape, in addition to smoothly winding the tape around a bobbin set in the housing when the locking lever is pushed so that the tape is retracted into the housing.

In order to accomplish the above object, the present invention provides a tape locking device for a tape measure, the tape measure including a housing, a coiled tape connected at its first end to a spring and wound around a bobbin set in the housing, and a tab attached to the second end of the tape for allowing a user to grasp the tape when drawing out the tape, and positioned outside a slot formed on the lower end of a wall of the housing; the tape locking device comprising a locking lever hinged to the upper portion of the wall of the housing in such a way to be rotated frontward and rearward around a hinged joint, and a cylinder connected to the lower portion of a connecting piece downwardly extending from the locking lever, with a coil spring fitted over the cylinder, whereby the stopper having a cone shape and made of rubber is connected to the end of the cylinder, and elastically biased by the coil spring to be wedged into the gap between a part of the tape wound around the bobbin and a unwound part of the tape led to the slot.

Preferably, the stopper has a cone shape so as to be brought into contact simultaneously with the outer circumferential surface of the tape wound around the bobbin and the unwound part of the tape led to the slot. And, the stopper is made of a material having a predetermined friction coefficient relative to a smooth tape surface, such as rubber, or synthetic resin.

Further, the stopper is always biased by the coil spring fitted over the cylinder in a direction such that the stopper is brought into contact with both the outer circumferential surface of the tape having a radius which becomes smaller as the tape is drawn out from the housing, and the unwound part of the upper surface of the tape led to the slot.

When releasing the tape after drawing a desired length of tape from the housing, the tape tends to be retracted into the housing by the spring connected to the tape. At this time, the frictional force of the stopper is applied to the tape, such that the tape is locked as it is appropriately drawn. When pushing the locking lever mounted on the upper portion of the housing, the cylinder having the stopper moves toward the front wall of the housing to remove the stopper from the gap between the wound part of the tape and the unwound part of the tape led to the slot, thus accomplishing smooth winding of the tape around the bobbin.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
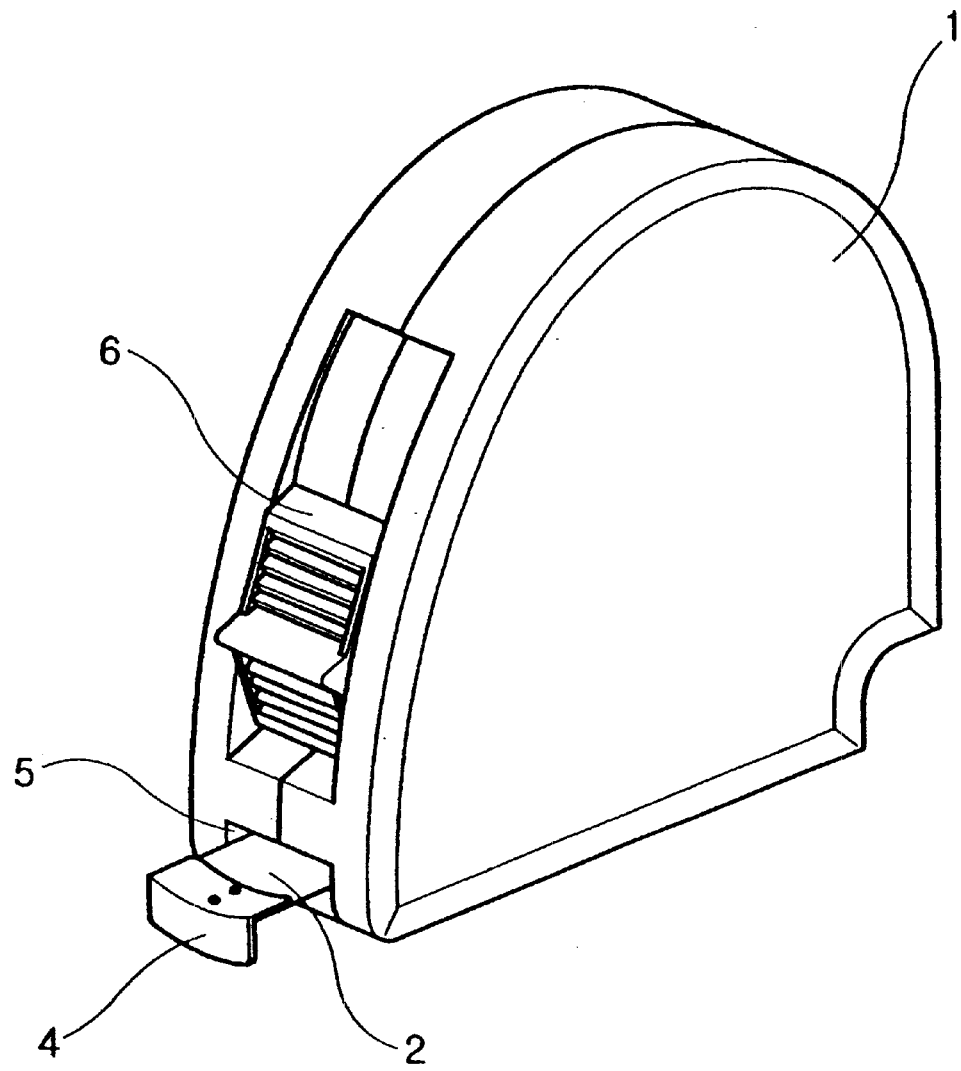
FIG. 1 is a perspective view showing a conventional tape measure provided with a locking device.
Figure 2:
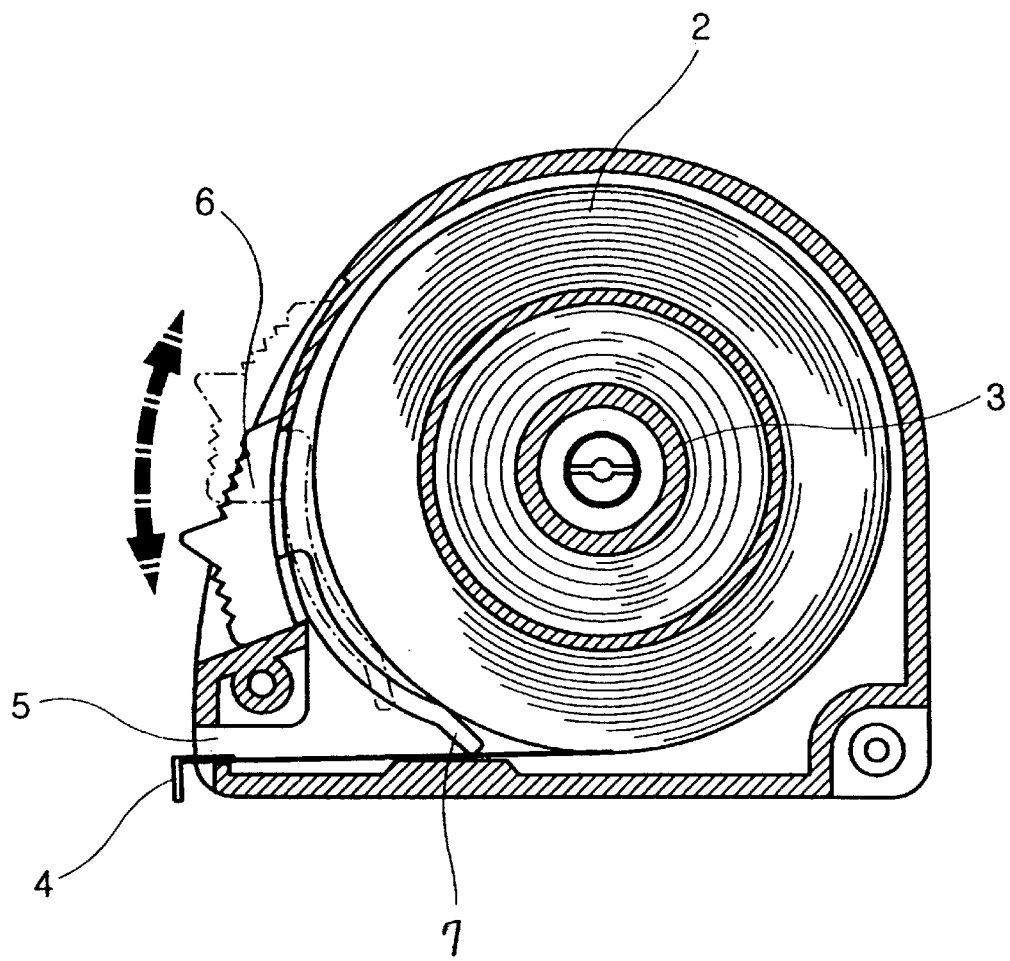
FIG. 2 is a sectional view of the conventional tape measure.

Reference now should be made to the drawings, in which the same reference numerals are used throughout the different drawings to designate the same or similar components.

Figure 3:
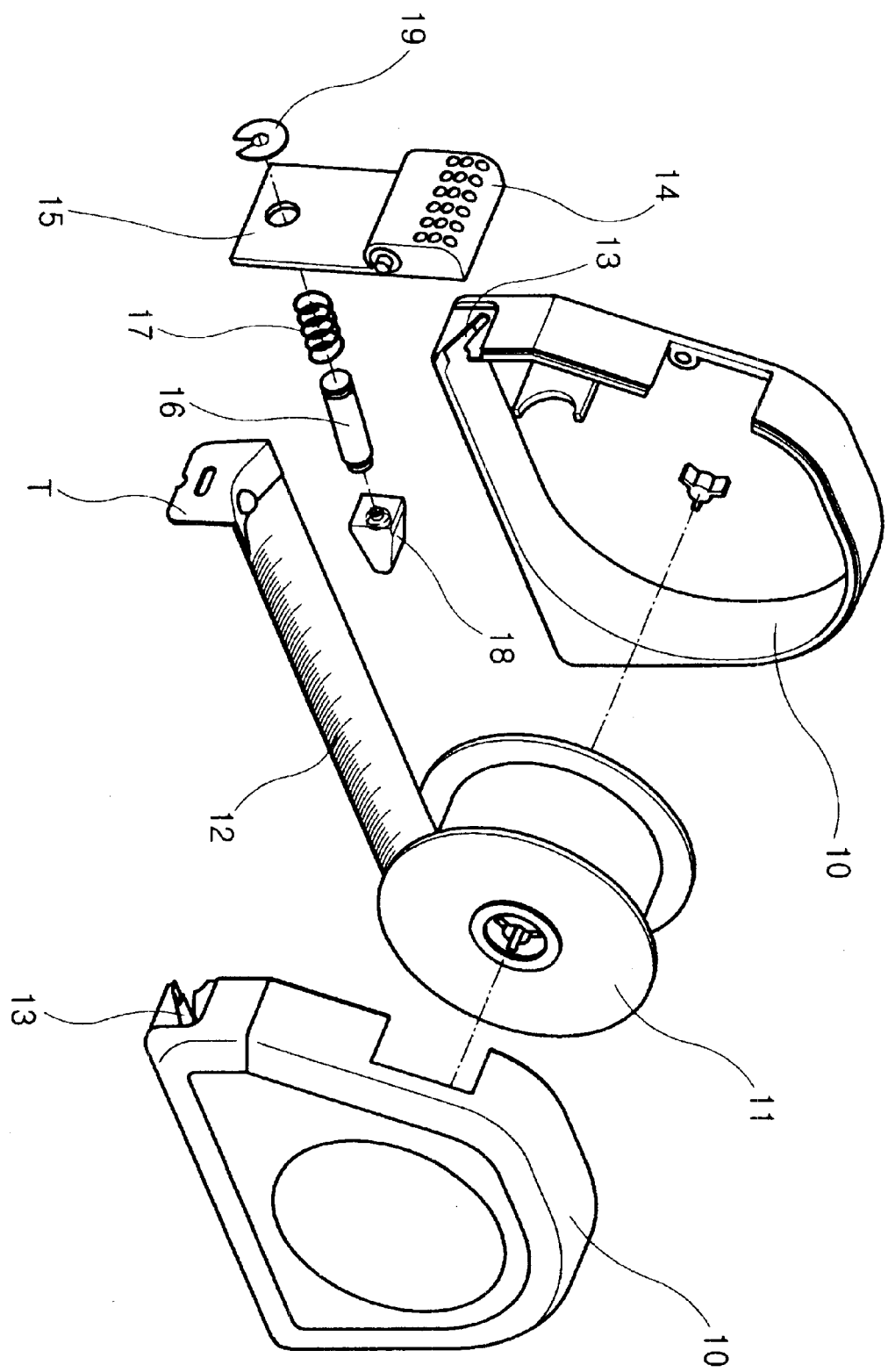
FIG. 3 is an exploded perspective view of a tape measure according to this invention.
Figure 4:
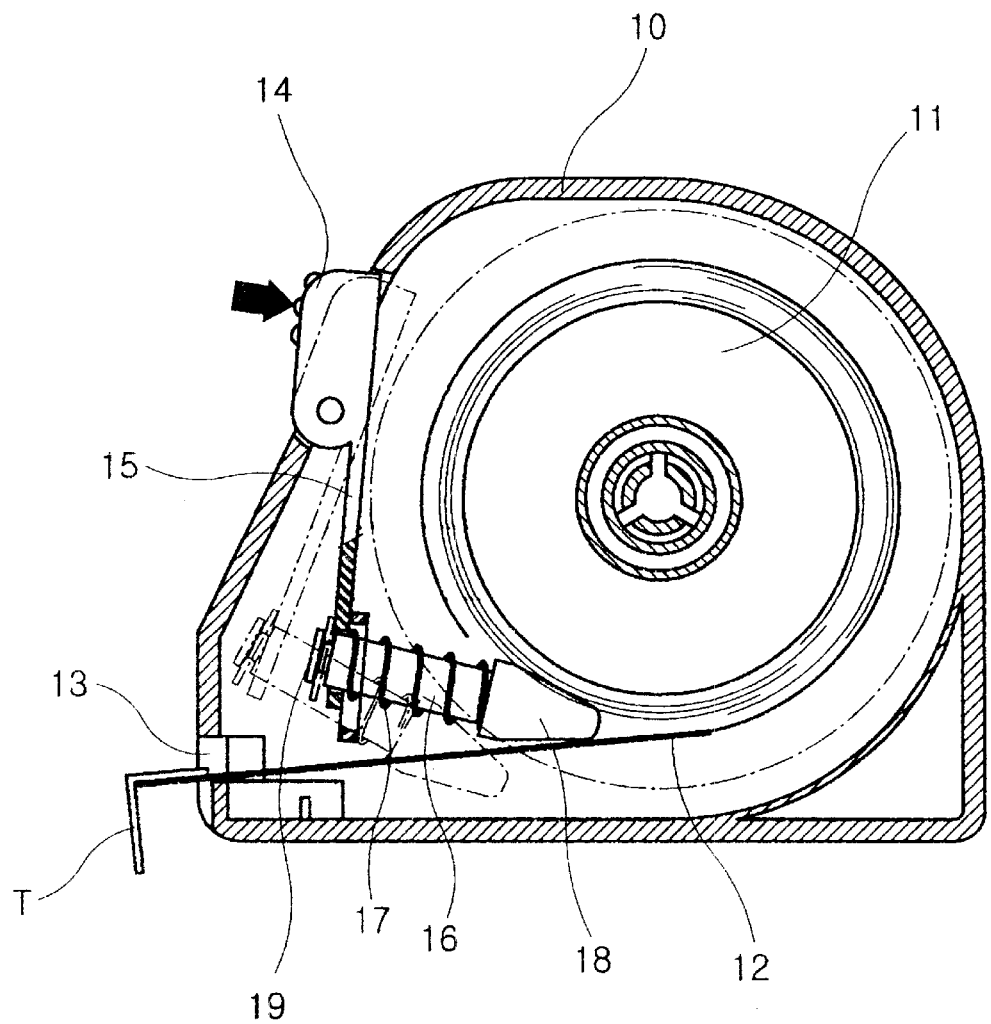
FIG. 4 is a sectional view of the tape measure of this invention.
Figure 5:
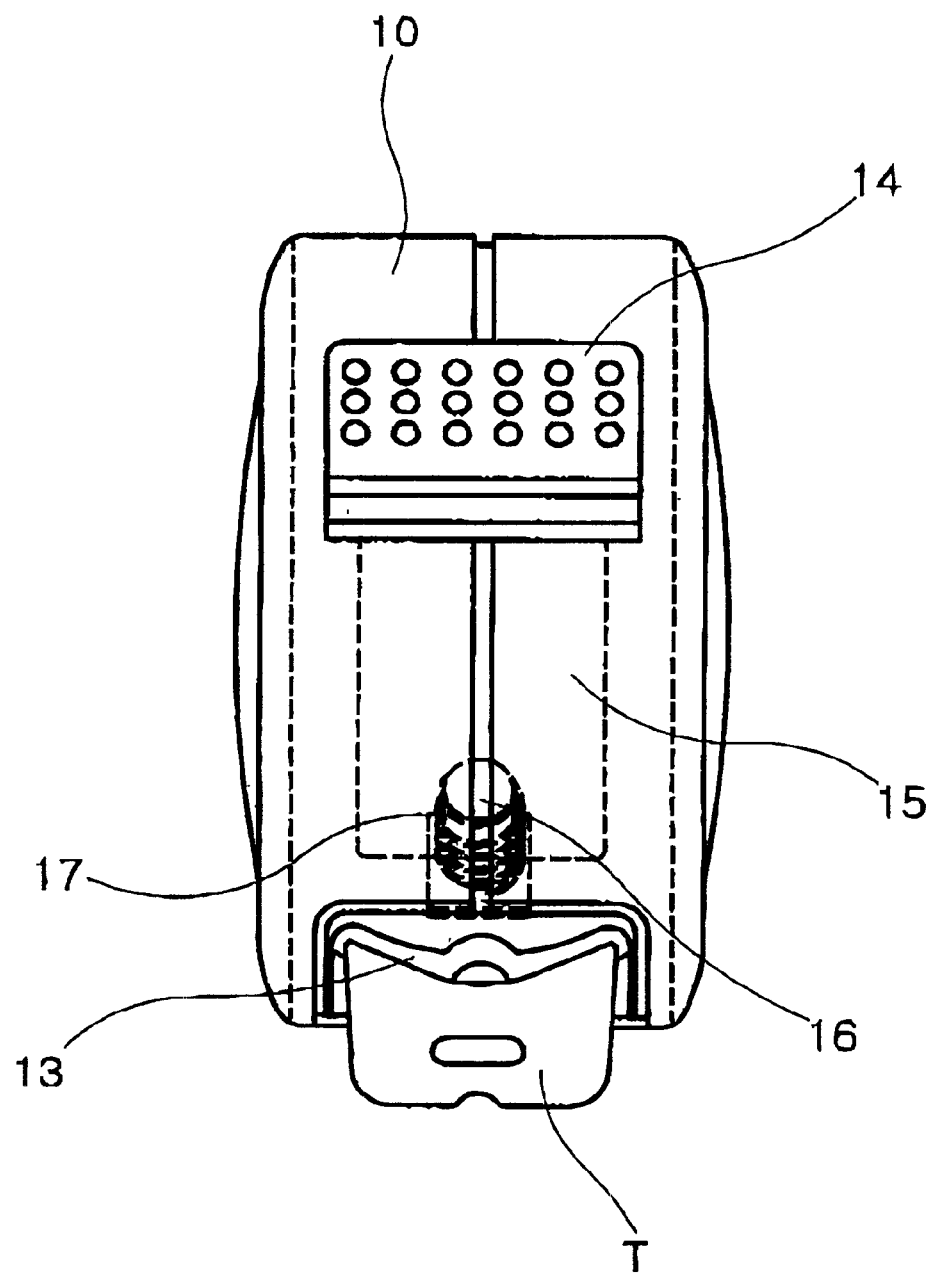
FIG. 5 is a front view of the tape measure of this invention.

FIG. 3 is an exploded perspective view of a tape measure according to this invention, FIG. 4 is a sectional view of the tape measure of this invention, and FIG. 5 is a front view of the tape measure of this invention.

As shown in the drawings, the tape locking device for tape measures of this invention includes a locking lever 14 having a connecting piece 15, a cylinder 16 provided with a coil spring 17, and a stopper 18. The locking lever 14 is hinged to the upper portion of the wall of a housing 10 in such a way to be rotated frontward and rearward around the hinged joint, and the connecting piece 15 downwardly extends from the locking lever 14. The cylinder 16 is fitted, at its first end, into a hole formed at the lower portion of the connecting piece 15. The coil spring 17 is fitted over the cylinder 16. The stopper 18 is made of a frictional material, such as rubber.

According to this invention, when the tape 12 wound around a bobbin 11 set in the housing 10 is pulled out through the slot 13 formed on the lower portion of the housing, a triangle-shaped gap is formed between the unwound part of the tape 12 led to the slot 13 and the outer circumferential surface of the part of the tape 12 wound around the bobbin 11. At this time, the stopper 18 is elastically biased by the coil spring to be inserted into the triangular gap when releasing the locking lever 14 after drawing a desired length of tape 12 from the slot 13, so the drawn tape 12 is automatically locked by a frictional force applied by the stopper 18.

The locking lever 14 provided with the connecting piece 15 downwardly extending therefrom is hinged to the upper portion of the wall of the housing 10 in such a way as to be rotated frontward and rearward around the hinged joint by the push operation of a user. The cylinder 16 having a tetragonal shape or round shape in its cross-section is fitted, at its first end, into the hole formed on the lower portion of the connecting piece 15. On the other hand, the second end of the cylinder 16 faces the wound part of the tape 12 around the bobbin 11.

The coil spring 17 having elasticity is fitted over the cylinder 16. The stopper 18 connected to the second end of the cylinder 16 is made of a material having a high surface frictional coefficient, such as rubber, or synthetic resin. The end of the cylinder 16 connected to the connecting piece 15 is fastened to the connecting piece 15 by a spring washer 19.

The stopper 18 is elastically biased by the coil spring 17 to be wedged into the triangular gap between the outer circumferential surface of the wound part of the tape 12 around the bobbin 11 and the linear part of the tape 12 led to the slot 13. Preferably, the stopper 18 has a wedge shape, and is tapered in a direction toward its end in such a way as to tightly come into contact with both the wound part of the tape 12 and the unwound part of the tape 12.

The tape 12 is brought into contact with a surface of the stopper 18, when pulling out the tape 12 through the slot 13 formed on the lower portion of the front wall of the housing 10 while unwinding the tape 12 from the bobbin 11 set in the housing 10. When releasing the tape 12 after drawing out the tape 12 from the housing 10, the wedge-shaped stopper 18 applies frictional force to both the unwound part and the wound part of the tape 12, thus automatically locking the drawn tape 12.

On the other hand, when it is required to retract the drawn tape into the inside of the housing 10, a user pushes the locking lever 14. Then, the connecting piece 15 connected to the lower portion of the locking lever 14 is moved toward the front wall of the housing 10. At this time, the cylinder 16 connected to the end of the connecting piece 15 is also moved in the same direction, thus removing the stopper 18 from the gap between the wound part of the tape 12 and the linear part of the tape 12 led to the slot 13.

At this time, the tape 12 is automatically wound around the bobbin 11 after passing through the slot 13 by the elastic force of the spring connected to the bobbin 11. In such a case, the winding speed of the tape 12 around the bobbin 11 is controlled by the user manipulating the locking lever 14, and so the tape 12 is smoothly retracted into the housing.

The operation of the tape locking device constructed in this way is as follows.

First, a user holds the housing of the tape measure with his one hand while pulling, with his other hand, the tab T positioned outside the slot 13 formed on the lower end of the wall of the housing 10 such that a desired length of the tape is drawn out from the housing 10. At this time, when the tape 12 is released, the tape 12 tends to be retracted into the housing 10. However, the frictional force of the stopper 18 is applied to the tape 12, such that the tape 12 is locked as it is appropriately drawn.

When finishing measuring the length of the desired object with the tape 12 drawn out from the housing 10, the user pushes the locking lever 14 protrusively mounted to the upper portion of the wall of the housing 10 such that the wedge-shaped stopper 18 connected to the connecting piece 15 is removed from the gap between the wound part of the tape 12 around the bobbin 11 and the unwound part of the tape 12 led to the slot 13, thus automatically winding the tape 12 around the bobbin 11 set in the housing 10.

As described above, the present invention provides a tape locking device for a tape measure, which has a locking lever hinged to the upper portion of the wall of a housing in such a way to be rotated frontward and rearward around a hinged joint, and a cylinder connected, at its first end, to a connecting piece downwardly extending from the locking lever, and connected, at its second end, to a stopper, with a coil spring fitted over the cylinder, whereby the stopper is elastically biased by the coil spring to be wedged in the gap between a wound part of the tape around the bobbin and a linear part of the tape led to the slot when releasing the locking lever after drawing a desired length of tape from the slot, thus automatically locking the drawn tape, in addition to smooth winding of the tape around a bobbin set in the housing when the locking lever is pushed so that the tape is retracted into the housing.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tape locking device for a tape measure, said tape measure having a housing, a coiled tape connected to a spring at a first end of the tape and wound around a bobbin set in the housing, and a tab attached to a second end of said tape, and positioned outside a slot formed on a lower end of a wall of the housing to allow a user to grasp the tape when drawing out the tape, the tape locking device comprising:

a locking lever hinged to an upper portion of the wall of said housing in such a way to be rotated frontward and rearward around a hinged joint, with a connecting piece downwardly extending from said locking lever;

a cylinder connected at a first end thereof to a hole formed at a lower portion of said connecting piece, with a coil spring fitted over the cylinder; and a wedge-shaped stopper connected to a second end of the cylinder, and having a desired frictional force, whereby said stopper is elastically biased by the coil spring to be wedged in a gap between an outer circumferential surface of a wound part of the tape around the bobbin and a linear part of the tape led to the slot when releasing the locking lever after drawing a desired length of tape from the slot, so the drawn tape is automatically locked by a frictional contact between the stopper surface and the drawn tape surface.

2. The tape locking device according to claim 1, wherein said cylinder is perpendicular to the connecting piece.

3. The tape locking device according to claim 1, wherein said stopper is made of a material having a high surface friction, such as rubber, or synthetic resin.

* * * * *